US011563550B2

(12) United States Patent
Ryu et al.

(10) Patent No.: US 11,563,550 B2
(45) Date of Patent: Jan. 24, 2023

(54) TRANSMISSION CONFIGURATION INDICATOR STATE ACTIVATION AND DEACTIVATION

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US); Kiran Venugopal, Raritan, NJ (US); Tianyang Bai, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,988

(22) Filed: Aug. 26, 2020

(65) Prior Publication Data

US 2021/0067306 A1    Mar. 4, 2021

Related U.S. Application Data

(60) Provisional application No. 62/894,274, filed on Aug. 30, 2019.

(51) Int. Cl.
*H04L 5/00* (2006.01)
*H04W 24/10* (2009.01)
*H04W 72/04* (2009.01)

(52) U.S. Cl.
CPC ............ *H04L 5/0098* (2013.01); *H04L 5/001* (2013.01); *H04L 5/0048* (2013.01); *H04W 24/10* (2013.01);

(Continued)

(58) Field of Classification Search
CPC ..... H04L 5/0098; H04L 5/001; H04L 5/0048; H04W 24/10; H04W 72/042; H04W 72/0453
See application file for complete search history.

(56) References Cited

U.S. PATENT DOCUMENTS 10,959,218 B2 *   3/2021   Babaci ............. H04W 72/0406
2019/0254110 A1   8/2019   He et al.
(Continued)

OTHER PUBLICATIONS

Ericsson: "Remaining Issues on Beam Measurement and Reporting", 3GPP TSG-RAN WG1 Meeting #93, 3GPP Draft, R1-1806217 Remaining Issues For Beam Measurement and Reporting, 3rd Generation Partnership Project (3GPP), Mobile Competence Centre, 650, Route Des Lucioles, F-06921 Sophia-Antipolis Cedex, vol. RAN WG1, No. Busan, Korea, May 21, 2018-May 25, 2018, May 20, 2018 (May 20, 2018), pp. 1-13, XP051441426, Retrieved from the Internet: URL: http://www.3gpp.org/ftp/Meetings%5F3GPP%5FSYNC/RAN1/Docs/ & http://www.3gpp.org/ftp/tsg%.

(Continued)

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive an activation status message identifying one or more transmission configuration indicator (TCI) states or one or more spatial relationships, the activation status message being configured to alter one or more activation statuses for the one or more TCI states or the one or more spatial relationships in a single bandwidth part associated with a single component carrier; and selectively alter the one or more activation statuses of the one or more TCI states or the one or more spatial relationships in a plurality of bandwidth parts associated with a plurality of component (Continued)

carriers based at least in part on receiving the activation status message. Numerous other aspects are provided.

30 Claims, 9 Drawing Sheets

(52) U.S. Cl.
CPC ..... *H04W 72/042* (2013.01); *H04W 72/0453* (2013.01)

(56) References Cited

U.S. PATENT DOCUMENTS

| | | | |
|---|---|---|---|
| 2020/0178261 A1* | 6/2020 | Ioffe | H04W 72/085 |
| 2020/0213066 A1* | 7/2020 | Ma | H04W 24/02 |
| 2021/0028843 A1* | 1/2021 | Zhou | H04B 7/0626 |
| 2021/0234752 A1* | 7/2021 | Matsumura | H04L 41/0668 |

OTHER PUBLICATIONS

International Search Report and Written Opinion—PCT/US2020/070467—ISA/EPO—dated Nov. 24, 2020.

* cited by examiner

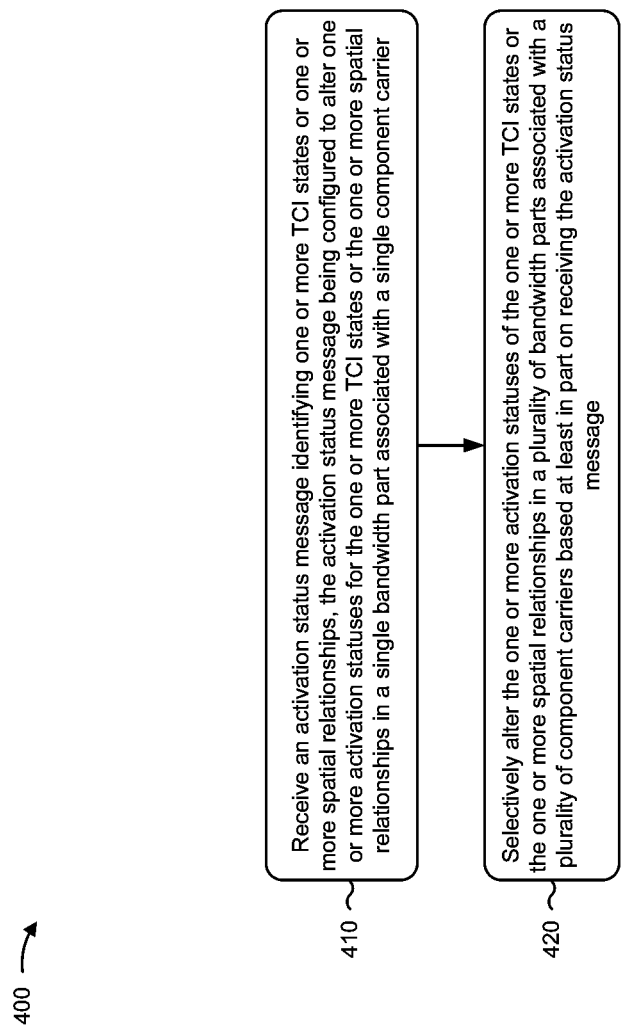

TRANSMISSION CONFIGURATION INDICATOR STATE ACTIVATION AND DEACTIVATION

CROSS-REFERENCE TO RELATED APPLICATION

This patent application claims priority to U.S. Provisional Patent Application No. 62/894,274, filed on Aug. 30, 2019, entitled "TRANSMISSION CONFIGURATION INDICATOR STATE ACTIVATION AND DEACTIVATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmission configuration indicator state activation and deactivation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an activation status message identifying one or more transmission configuration indicator (TCI) states or one or more spatial relationships, the activation status message being configured to alter one or more activation statuses for the one or more TCI states or the one or more spatial relationships in a single bandwidth part associated with a single component carrier; and selectively altering the one or more activation statuses of the one or more TCI states or the one or more spatial relationships in a plurality of bandwidth parts associated with a plurality of component carriers based at least in part on receiving the activation status message.

In some aspects, a UE for wireless communication may include memory and one or more processors operatively coupled to the memory. The memory and the one or more processors may be configured to receive an activation status message identifying one or more TCI states or one or more spatial relationships, the activation status message being configured to alter one or more activation statuses for the one or more TCI states or the one or more spatial relationships in a single bandwidth part associated with a single component carrier; and selectively alter the one or more activation statuses of the one or more TCI states or the one or more spatial relationships in a plurality of bandwidth parts associated with a plurality of component carriers based at least in part on receiving the activation status message.

In some aspects, a non-transitory computer-readable medium may store one or more instructions for wireless communication. The one or more instructions, when executed by one or more processors of a UE, may cause the one or more processors to: receive an activation status message identifying one or more TCI states or one or more spatial relationships, the activation status message being configured to alter one or more activation statuses for the one or more TCI states or the one or more spatial relationships in a single bandwidth part associated with a single component carrier; and selectively alter the one or more activation statuses of the one or more TCI states or the one or more spatial relationships in a plurality of bandwidth parts associated with a plurality of component carriers based at least in part on receiving the activation status message.

In some aspects, an apparatus for wireless communication may include means for receiving an activation status message identifying one or more TCI states or one or more spatial relationships, the activation status message being configured to alter one or more activation statuses for the one or more TCI states or the one or more spatial relationships in a single bandwidth part associated with a single component carrier; and means for selectively altering the one or more activation statuses of the one or more TCI states or the one or more spatial relationships in a plurality of bandwidth parts associated with a plurality of component carriers based at least in part on receiving the activation status message.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
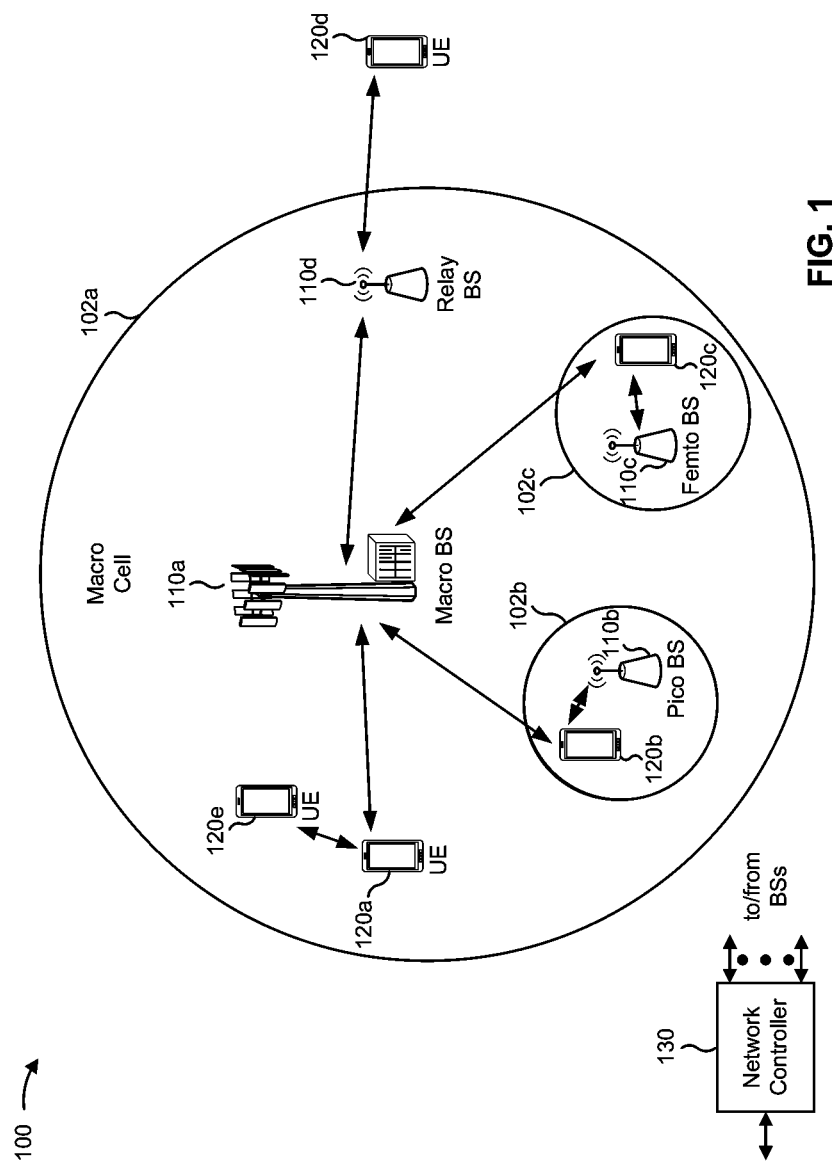
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
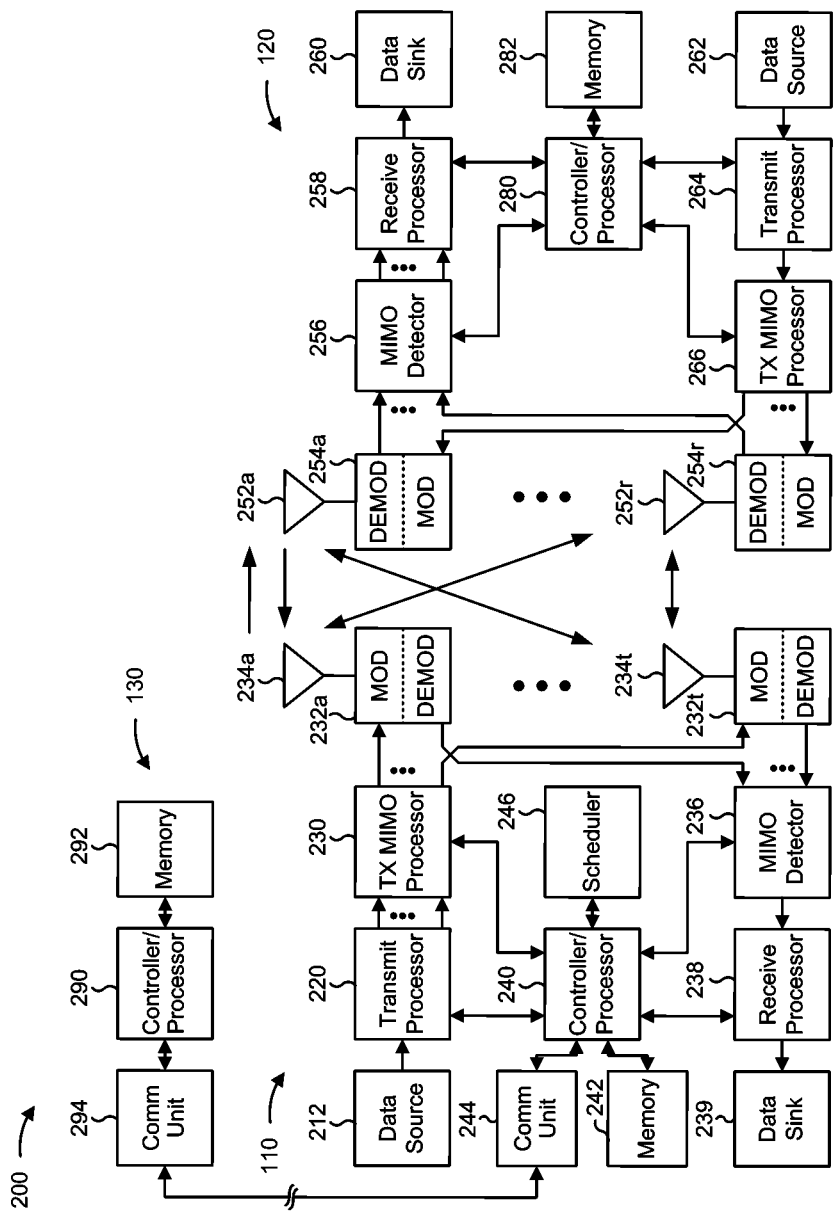
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission configuration indicator (TCI) state activation and deactivation, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for receiving an activation status message identifying one or more TCI states or one or more spatial relationships, the activation status message being configured to alter one or more activation statuses for the one or more TCI states or the one or more spatial relationships in a single bandwidth part associated with a single component carrier, means for selectively altering the one or more activation statuses of the one or more TCI states or the one or more spatial relationships in a plurality of bandwidth parts associated with a plurality of component carriers based at least in part on receiving the activation status message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, a UE may have a plurality of bandwidth parts that the UE may use for communication. For example, the UE may communicate with a BS using a plurality of component carriers, and each component carrier may have a plurality of bandwidth parts that are defined for the component carrier. Each bandwidth part may have a plurality of defined TCI states. For example, a UE may have a first component carrier with a first bandwidth part and a second bandwidth part, and the first bandwidth part may have a first TCI state and a second TCI state defined, and the second bandwidth part may have a third TCI state and a fourth TCI state defined. Similarly, the UE may have a second component carrier with a third bandwidth part and a fourth bandwidth part, and the third bandwidth part may have the first TCI state and the second TCI state defined, and the fourth bandwidth part may have the third TCI state and the fourth TCI state defined.

The TCI states define parameters for receiving and/or transmitting on a bandwidth part. For example, a UE may use a TCI state to determine a set of parameters with which a BS transmits a downlink signal, which may enable the UE to receive the downlink signal. Information identified based at least in part on a TCI may include quasi-co-location (QCL) information, beam identification information, and/or the like. A UE may be configured with, for example, up to 128 TCI states, which may be in an active state, an inactive state, and/or the like. For reception of a downlink channel, such as a physical downlink shared channel (PDSCH) or a physical downlink control channel (PDCCH), the UE may select an active TCI state to apply to the downlink channel to enable the UE to receive the channel. However, using separate activation and/or deactivation signaling may result in an excessive utilization of network resources. For example, a BS may transmit multiple transmissions to activate the same TCI state on multiple bandwidth parts of multiple component carriers in a single band. When bandwidth parts are in the same band, channel properties may be similar, which may result in the TCI state having the same activation status on multiple different bandwidth parts.

Some aspects described herein provide for TCI state activation and/or deactivation with reduced signaling overhead. Additionally, or alternatively, some aspects provide for activation and/or deactivation of another type of spatial relationship for bandwidth parts with reduced signaling overhead. For example, a UE may receive, from a BS, an activation status message that identifies an alteration to one or more activation statuses of one or more TCI states or one or more spatial relationships in a single bandwidth part of a single component carrier. Further, the UE may receive an activation status indicator (e.g., which may be a field of the activation status message) that may indicate whether to apply the activation status message to a plurality of bandwidth parts of a plurality of component carriers in the same band as an identified bandwidth part of the activation status message. In this case, based on the activation status message and the activation status indicator, the UE may determine to activate or deactivate, for example, a particular TCI state in a plurality of bandwidth parts in which the particular TCI state is defined. In this way, the BS and the UE may reduce a utilization of network resources, relative to separately indicating the alteration to the activation status of the particular TCI state for each bandwidth part for which the particular TCI state is defined.

FIGS. 3A-3D are diagrams illustrating an example 300 of TCI state activation and deactivation, in accordance with various aspects of the present disclosure. As shown in FIGS. 3A-3D, example 300 includes a BS 110 and a UE 120.

Figure 3A:
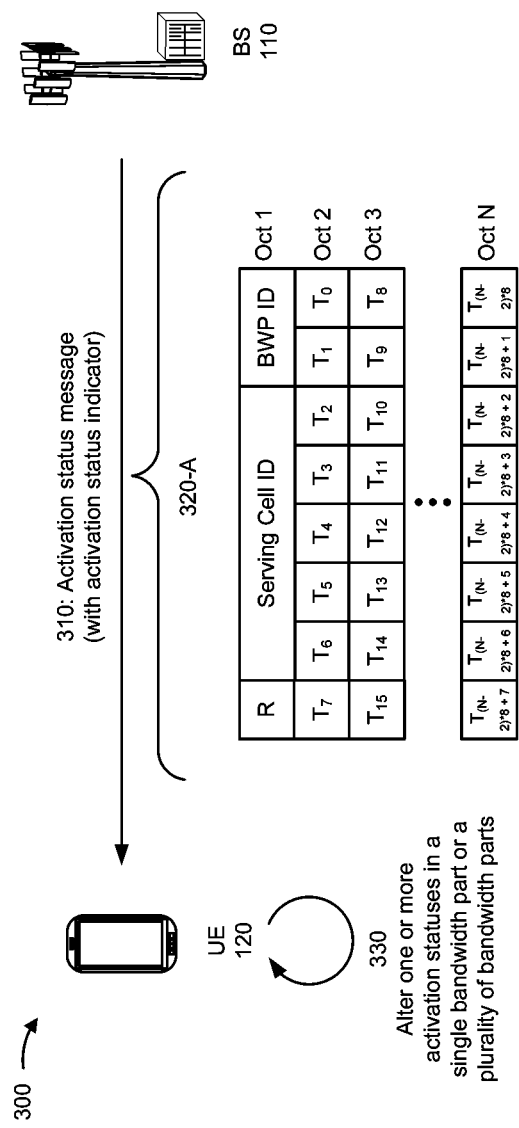
FIGS. 3A-3D are diagrams illustrating examples of TCI state activation and deactivation, in accordance with various aspects of the present disclosure.

As further shown in FIG. 3A, and by reference number 310, UE 120 may receive an activation status message, which may include an activation status indicator. For example, BS 110 may provide an activation status message that identifies one or more TCI states, one or more spatial relationships, and/or the like for a single bandwidth part and includes a field set to indicate whether the activation status message is to apply to a plurality of bandwidth parts. In some aspects, UE 120 may receive an activation status message separate from the activation status indicator. For example, UE 120 may receive the activation status indicator via a separate transmission that occurs before the activation status message, concurrent with the activation status message, after the activation status message, and/or the like.

In some aspects, BS 110 may determine a value for the activation status indicator based at least in part on receiving a UE capability indicator from UE 120. For example, UE 120 may provide the UE capability indicator to indicate whether UE 120 is capable of applying an activation status message for a single bandwidth part to a plurality of bandwidth parts in the same frequency band. In some aspects, BS 110 may convey the activation status indicator via a particular type of message. For example, BS 110 may set a radio resource control (RRC) configured flag or a bit indicator in a downlink control information (DCI) or a medium access control (MAC) control element (CE) (MAC CE).

As further shown in FIG. 3A, and by reference number 320-A, in one example, a MAC CE activation status message may include a set of octets (Oct 1 through Oct N) including information identifying a serving cell of BS 110 (Serving Cell ID), a bandwidth part to which the activation status message applies (BWP ID), and an activation status of a set of TCI states defined for the bandwidth part ($T_0$ to $T_{(N-2)*8+7}$). Further, the activation status message may include a reserved bit (R) that is set to indicate whether the TCI state activations or deactivations (e.g., the values for the activation statuses of the set of TCI states) for the bandwidth part are to apply to one or more other bandwidth parts in the same frequency band.

Figure 3B:
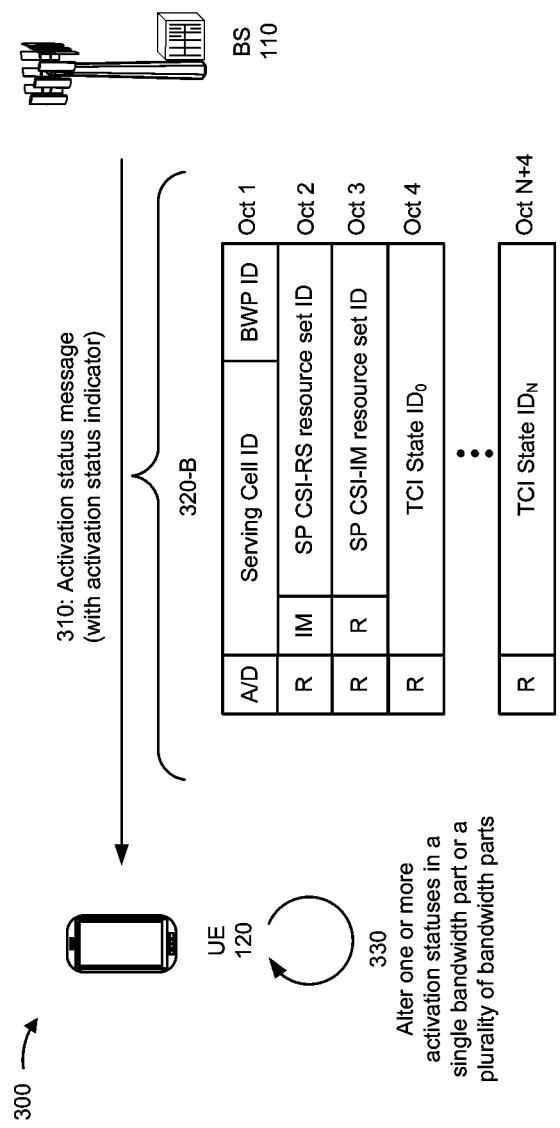

Similarly, as shown in FIG. 3B, and by reference number 320-B, in another example of an activation status message, the activation status message may include a set of octets including information identifying the serving cell, the bandwidth part, a semi-persistent (SP) channel state information (CSI) reference signal (RS) resource set, an SP CSI interference measurement (IM) resource set, and a set of TCI states. In this case, the activation status message includes a set of reserved bits to indicate whether the activation status message applies to a single bandwidth part or a plurality of bandwidth parts for a change to an activation status of, for example, the CSI-RS resource set, the CSI-IM resource set, the set of TCI states, and/or the like.

Figure 3C:
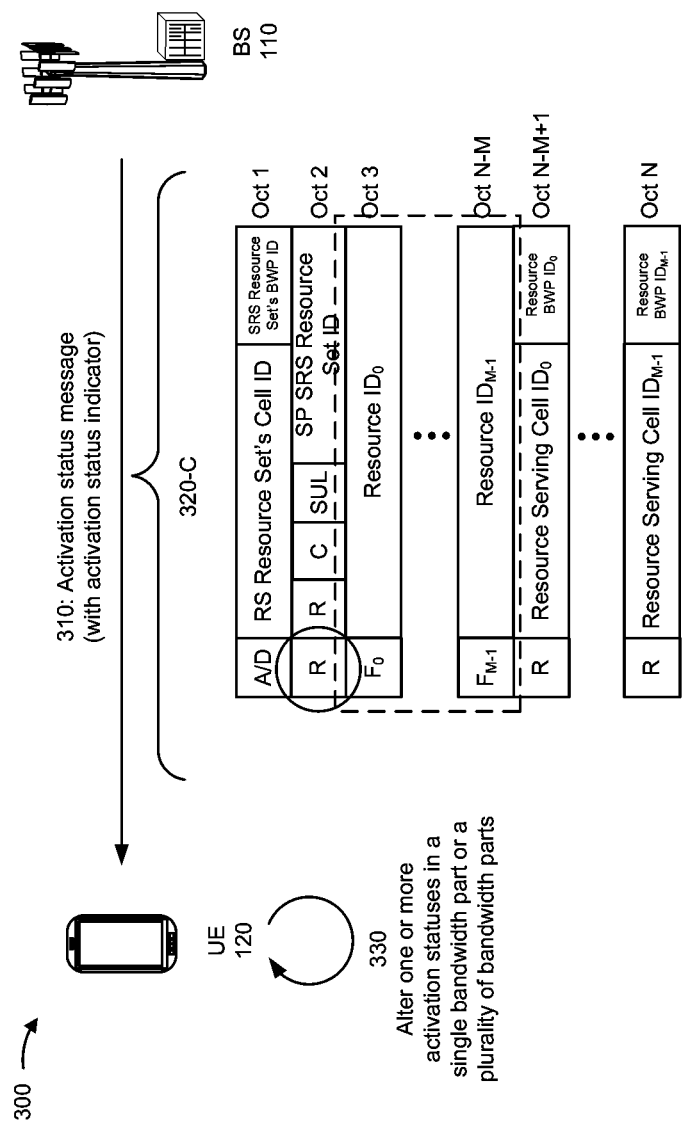

Similarly, as shown in FIG. 3C, and by reference number 320-C, in another example of an activation status message, the activation status message may include information for an alteration to an activation status of a spatial relationship. For example, the activation status message may include a reserved bit (R) to indicate whether the activation status message applies to spatial relationships in a plurality of bandwidth parts in the same frequency band as an identified bandwidth part and information identifying a plurality of resource set identifiers (Resource ID) from which UE 120 can derive a spatial relationship. Additionally, or alternatively, the activation status message includes a field to indicate whether an SP sounding reference signal (SRS) set is to be activated or deactivated (SP SRS Resource Set ID) in a single bandwidth part or, based on the activation status indicator, a plurality of bandwidth parts. In one example, the spatial relationship may include a relation between a reference RS and a target SRS. The reference RS may be an SS/PBCH block, a CSI-RS, or an SRS in some examples.

Figure 3D:
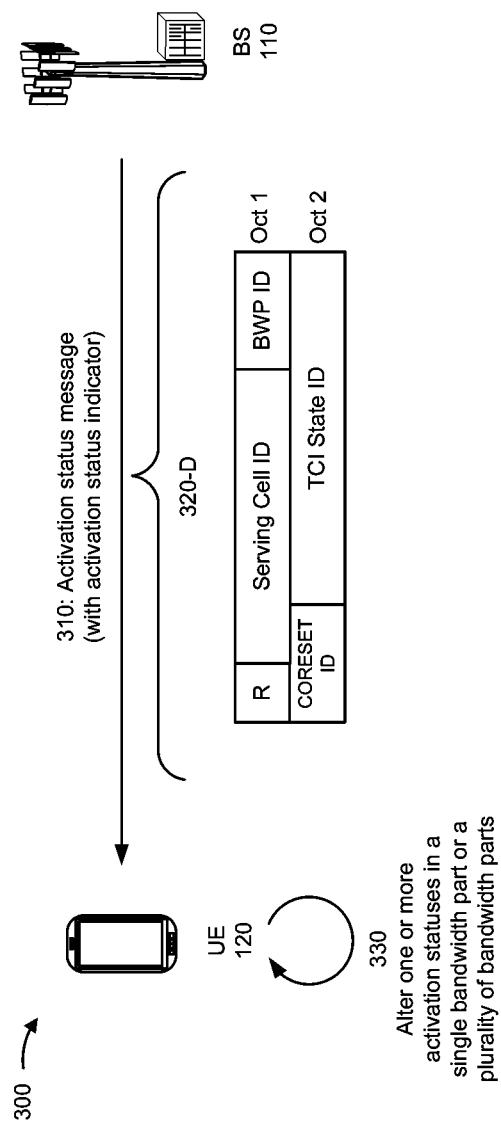

Similarly, as shown in FIG. 3D, and by reference number 320-D, in another example of an activation status message, the activation status message may include a reserved bit for the activation status indicator and a field to identify a single TCI state (TCI State ID) for a single identified bandwidth part (or a plurality of bandwidth parts based at least in part on a value of the activation status indicator). If the activation status indicator indicates the single TCI state activation is to be applied for the plurality of bandwidth parts, the field for the single TCI state may indicate that UE 120 is to activate an identified TCI state for all control resource sets (CORESETs) on all component carriers that have a corresponding TCI state with the same TCI state identifier as is identified in the field. For example, the activation status message may indicate that UE 120 is to activate a TCI state for a CORESET 0 in a first component carrier and another TCI state for a CORESET 0 in a second component carrier.

As further shown in FIG. 3A, and by reference number 330, based at least in part on receiving the activation status message, UE 120 may alter one or more activation statuses. For example, when the activation status indicator indicates that the activation status message is to apply to a single bandwidth part, UE 120 may alter one or more activation statuses of one or more TCI states or one or more spatial relationships in the single bandwidth part. Additionally, or alternatively, when the activation status indicator indicates that the activation status is to apply to a plurality of bandwidth parts, UE 120 may alter one or more activation statuses of one or more TCI states or one or more spatial relationships in the plurality of bandwidth parts. For example, UE 120 may activate a TCI state with a particular TCI indicator in a plurality of bandwidth parts. Additionally, or alternatively, UE 120 may deactivate the TCI state in the plurality of bandwidth parts.

In some aspects, UE 120 may receive a transmission from BS 110 based at least in part on activating or deactivating a TCI state, altering a spatial relationship, and/or the like. For example, UE 120 may receive a PDSCH, a PDCCH, and/or the like. Additionally, or alternatively, UE 120 may receive a CSI RS, a CSI IM, and/or the like. Additionally, or alternatively, UE 120 may transmit an SRS and/or the like.

As indicated above, FIGS. 3A-3D are provided as examples. Other examples may differ from what is described with respect to FIGS. 3A-3D.

FIG. 4 is a diagram illustrating an example process 400 performed, for example, by a UE, in accordance with various aspects of the present disclosure. Example process 400 is an example where the UE (e.g., UE 120 and/or the like) performs operations associated with TCI state activation and deactivation.

As shown in FIG. 4, in some aspects, process 400 may include receiving an activation status message identifying one or more TCI states or one or more spatial relationships, the activation status message being configured to alter one or more activation statuses for the one or more TCI states or the one or more spatial relationships in a single bandwidth part associated with a single component carrier (block 410). For example, the UE (e.g., using antenna 252, DEMOD 254, MIMO detector 256, receive processor 258, controller/processor 280, and/or the like) may receive an activation status message identifying one or more TCI states or one or more spatial relationships. In some aspects, the activation status message is configured to alter one or more activation statuses for the one or more TCI states or the one or more spatial relationships in a single bandwidth part associated with a single component carrier, as described above in connection with FIGS. 3A-3D.

In a first aspect, receiving the activation status message includes transmitting a UE capability indicator to indicate that the UE is capable of applying the activation status message to the plurality of bandwidth parts, and receiving the activation status message based at least in part on transmitting the UE capability indicator.

In a second aspect, alone or in combination with the first aspect, the plurality of bandwidth parts and the plurality of component carriers are in a same band.

In a third aspect, alone or in combination with one or more of the first through second aspects, the activation status message is a medium access control control element.

In a fourth aspect, alone or in combination with one or more of the first through third aspects, the activation status indicator is a bit indicator of a radio resource configuration message control message.

In a fifth aspect, alone or in combination with one or more of the first through fourth aspects, the activation status indicator is a bit indicator of a downlink control information of a downlink shared channel medium access control control element.

In a sixth aspect, alone or in combination with one or more of the first through fifth aspects, the one or more TCI states are associated with semi-persistent channel state information reference signal resources or channel state information interference measurement resources.

In a seventh aspect, alone or in combination with one or more of the first through sixth aspects, the one or more spatial relationships are associated with semi-persistent sounding reference signal resources.

In an eighth aspect, alone or in combination with one or more of the first through seventh aspects, the one or more TCI states are associated with physical downlink control channel resources.

In a ninth aspect, alone or in combination with one or more of the first through eighth aspects, the one or more TCI states are associated with physical downlink shared channel resources.

As further shown in FIG. 4, in some aspects, process 400 may include selectively altering the one or more activation statuses of the one or more TCI states or the one or more spatial relationships in a plurality of bandwidth parts associated with a plurality of component carriers based at least in part on receiving the activation status message (block 420). For example, the UE (e.g., using antenna 252, DEMOD 254, MIMO detector 256, receive processor 258, controller/processor 280, and/or the like) may selectively alter the one or more activation statuses of the one or more TCI states or the one or more spatial relationships in a plurality of bandwidth parts associated with a plurality of component carriers based at least in part on receiving the activation status message, as described above in connection with FIGS. 3A-3D.

In a tenth aspect, alone or in combination with one or more of the first through ninth aspects, the activation status message is an activation message, and selectively altering the one or more activation statuses of the one or more TCI states or the one or more spatial relationships includes activating the one or more TCI states or the one or more spatial relationships.

In an eleventh aspect, alone or in combination with one or more of the first through tenth aspects, the activation status message is a deactivation message, and selectively altering the one or more activation statuses of the one or more TCI states includes deactivating the one or more TCI states or the one or more spatial relationships.

In a twelfth aspect, alone or in combination with one or more of the first through eleventh aspects, selectively altering the one or more activation statuses includes altering the one or more spatial relationships in the plurality of bandwidth parts.

In a thirteenth aspect, alone or in combination with one or more of the first through twelfth aspects, process 400 includes receiving the activation status indicator indicating that the activation status message is to apply to more than one bandwidth part, and selectively altering the one or more activation statuses of the one or more TCI states or the one or more spatial relationships in the plurality of bandwidth parts associated with the plurality of component carriers includes altering the one or more activation statuses of the one or more TCI states or the one or more spatial relationships in the plurality of bandwidth parts associated with the plurality of component carriers based at least in part on the activation status indicator.

In a fourteenth aspect, alone or in combination with one or more of the first through thirteenth aspects, selectively altering the one or more activation statuses may include selectively altering the one or more activation statuses based at least in part on an activation status indicator indicating whether the activation status message is to apply to the plurality of bandwidth parts associated with the plurality of component carriers.

Process 400 may include additional aspects, such as any single aspect or any combination of aspects described above and/or in connection with one or more other processes described elsewhere herein.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
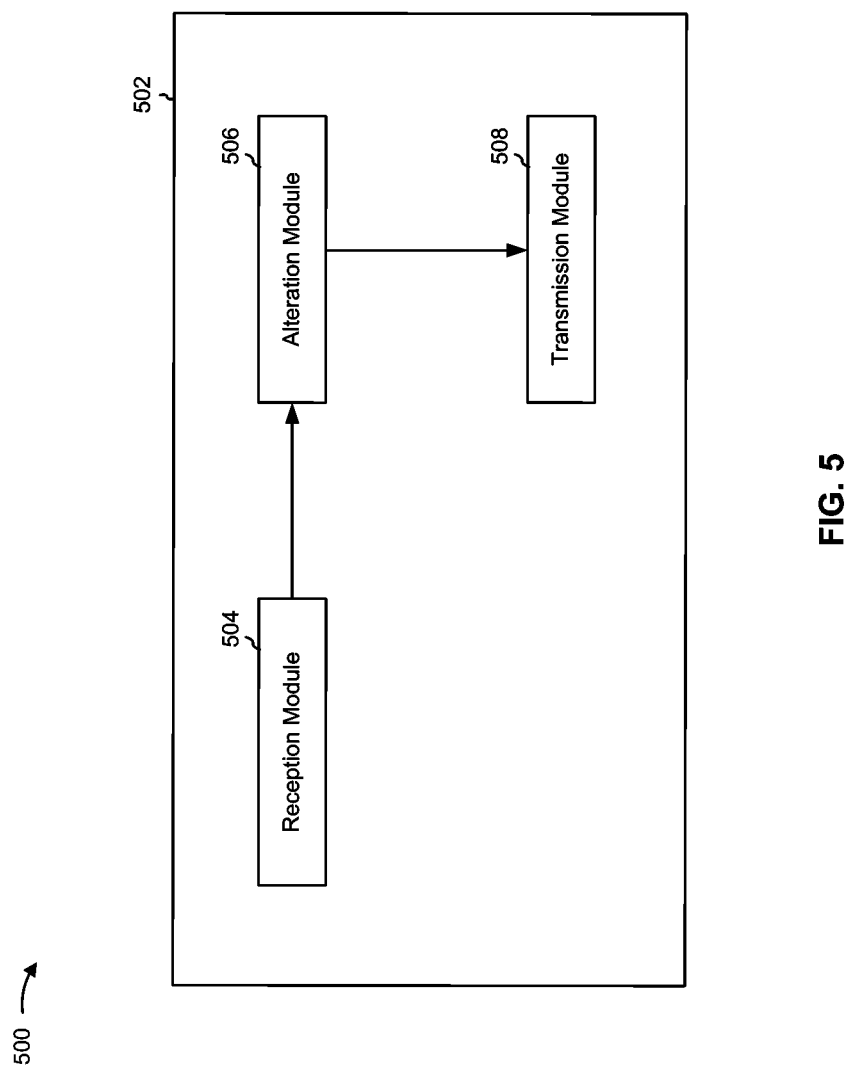
FIG. 5 is a conceptual data flow diagram illustrating an example of a data flow between different modules/means/components in an example apparatus.

FIG. 5 is a conceptual data flow diagram illustrating an example 500 of a data flow between different modules/means/components in an example apparatus 502. The apparatus 502 may include, for example, a UE (e.g., UE 120). In some aspects, the apparatus 502 includes a reception module 504, an alteration module 506, and a transmission module 508.

In some aspects, reception module 504 may receive transmissions that are transmitted to apparatus 502. For example, reception module 504 may receive a transmission that includes an activation status message, an activation status indicator, and/or the like. In some aspects, reception module 504 may receive a MAC CE that includes the activation status message and the activation status indicator, as described with regard to FIGS. 3A-3D.

In some aspects, alteration module 506 may alter one or more activation statuses of one or more TCI states or one or more spatial relationships. For example, based on an activation status indicator indicating that an activation status message is to apply to a plurality of bandwidth parts, alteration module 506 may activate or deactivate a TCI state in the plurality of bandwidth parts to enable the apparatus 502 to receive transmissions from, for example, a BS (e.g., BS 110), as described with regard to FIGS. 3A-3D.

In some aspects, transmission module 508 may transmit information to, for example, a BS. For example, transmission module 508 may provide a UE capability indicator indicating that the apparatus 502 is capable of applying a single activation status message for a single bandwidth part to a plurality of bandwidth parts, as described with regard to FIGS. 3A-3D.

In some aspects, apparatus 502 may include additional modules that perform each of the blocks of the algorithm in the aforementioned flow chart of FIG. 4. Each block in the aforementioned flow chart of FIG. 4 may be performed by a module, and apparatus 502 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
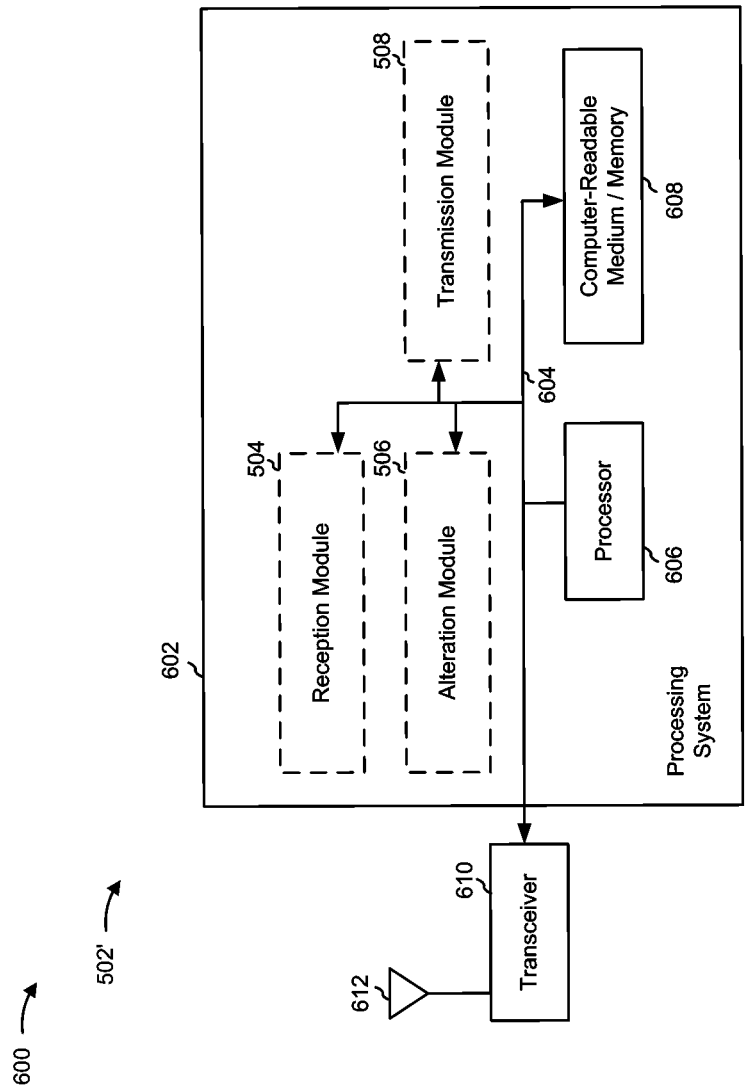
FIG. 6 is a diagram illustrating an example of a hardware implementation for an apparatus employing a processing system.

FIG. 6 is a diagram illustrating an example 600 of a hardware implementation for an apparatus 502' (e.g., apparatus 502 described above in connection with FIG. 5) employing a processing system 602. The apparatus 502' may include, for example, a UE (e.g., UE 120).

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, and/or 508, and the computer-readable medium/memory 608. The bus 604 may also link various other circuits such as timing sources, peripherals, voltage regulators, and power management circuits, which are well known in the art, and therefore, will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602. In addition, the transceiver 610 receives information from the processing system 602 and, based at least in part on the received information, generates a signal to be applied to the one or more antennas 612.

The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the modules 504, 506, and/or 508. The modules may be software modules running in the processor 606, resident/stored in the computer readable medium/memory 608, one or more hardware modules coupled to the processor 606, or some combination thereof.

In some aspects, the apparatus 502 for wireless communication includes means for receiving an activation status message identifying one or more TCI states or one or more spatial relationships, the activation status message being configured to alter one or more activation statuses for the one or more TCI states or the one or more spatial relationships in a single bandwidth part associated with a single component carrier, means for selectively altering the one or more activation statuses of the one or more TCI states or the one or more spatial relationships in a plurality of bandwidth parts associated with a plurality of component carriers based at least in part on receiving the activation status message, and/or the like. The aforementioned means may be one or more of the aforementioned modules of the apparatus 502 and/or the processing system 602 of the apparatus 502' configured to perform the functions recited by the aforementioned means.

As indicated above, FIG. 6 is provided as an example. Other examples may differ from what is described with regard to FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an activation status message identifying one or more transmission configuration indicator (TCI) states or one or more spatial relationships, the activation status message being configured to alter one or more activation statuses for the one or more TCI states or the one or more spatial relationships in a single bandwidth part associated with a single component carrier; and
   altering the one or more activation statuses of the one or more TCI states or the one or more spatial relationships in a plurality of bandwidth parts associated with a plurality of component carriers based at least in part on an activation status indicator indicating whether the activation status message is to apply to more than one bandwidth part of the plurality of bandwidth parts.

2. The method of claim 1, wherein the activation status message is an activation message, and
   wherein altering the one or more activation statuses of the one or more TCI states or the one or more spatial relationships comprises:
      activating the one or more TCI states or the one or more spatial relationships.

3. The method of claim 1, wherein the activation status message is a deactivation message, and
   wherein altering the one or more activation statuses of the one or more TCI states comprises:
      deactivating the one or more TCI states or the one or more spatial relationships.

4. The method of claim 1, wherein altering the one or more activation statuses comprises:
   altering the one or more spatial relationships in the plurality of bandwidth parts.

5. The method of claim 1, further comprising:
   transmitting a UE capability indicator to indicate that the UE is capable of applying the activation status message to the plurality of bandwidth parts; and
   wherein receiving the activation status message comprises:
      receiving the activation status message based at least in part on transmitting the UE capability indicator.

6. The method of claim 1, wherein the plurality of bandwidth parts and the plurality of component carriers are in a same band.

7. The method of claim 1, wherein the activation status message is a medium access control control element.

8. The method of claim 1, further comprising:
   receiving the activation status indicator indicating that the activation status message is to apply to more than one bandwidth part of the plurality of bandwidth parts.

9. The method of claim 1, wherein the activation status indicator is a bit indicator of a radio resource configuration message control message.

10. The method of claim 1, wherein the activation status indicator is a bit indicator of a downlink control information of a downlink shared channel medium access control control element.

11. The method of claim 1, wherein the one or more TCI states are associated with semi-persistent channel state information reference signal resources or channel state information interference measurement resources.

12. The method of claim 1, wherein the one or more spatial relationships are associated with semi-persistent sounding reference signal resources.

13. The method of claim 1, wherein the one or more TCI states are associated with physical downlink control channel resources.

14. The method of claim 1, wherein the one or more TCI states are associated with physical downlink shared channel resources.

15. A user equipment (UE) for wireless communication, comprising:
   a memory; and
   one or more processors coupled to the memory, the one or more processors configured to:
      receive an activation status message identifying one or more transmission configuration indicator (TCI) states or one or more spatial relationships, the activation status message being configured to alter one or more activation statuses for the one or more TCI states or the one or more spatial relationships in a single bandwidth part associated with a single component carrier; and
      alter the one or more activation statuses of the one or more TCI states or the one or more spatial relationships in a plurality of bandwidth parts associated with a plurality of component carriers based at least in part on an activation status indicator indicating whether the activation status message is to apply to more than one bandwidth part of the plurality of bandwidth parts.

16. The UE of claim 15, wherein the activation status message is an activation message, and
   wherein the one or more processors, to alter the one or more activation statuses of the one or more TCI states or the one or more spatial relationships, are configured to:

activate the one or more TCI states or the one or more spatial relationships.

17. The UE of claim 15, wherein the activation status message is a deactivation message, and
wherein the one or more processors, to alter the one or more activation statuses of the one or more TCI states, are configured to:
deactivate the one or more TCI states or the one or more spatial relationships.

18. The UE of claim 15, wherein the one or more processors, to alter the one or more activation statuses, are configured to:
alter the one or more spatial relationships in the plurality of bandwidth parts.

19. The UE of claim 15, wherein the one or more processors are further configured to:
transmit a UE capability indicator to indicate that the UE is capable of applying the activation status message to the plurality of bandwidth parts; and
wherein the one or more processors, to receive the activation status message, are configured to:
receive the activation status message based at least in part on transmitting the UE capability indicator.

20. The UE of claim 15, wherein the plurality of bandwidth parts and the plurality of component carriers are in a same band.

21. The UE of claim 15, wherein the activation status message is a medium access control control element.

22. The UE of claim 15, wherein the one or more processors are further configured to:
receive the activation status indicator indicating that the activation status message is to apply to more than one bandwidth part of the plurality of bandwidth parts.

23. The UE of claim 15, wherein the activation status indicator is a bit indicator of a radio resource configuration message control message.

24. The UE of claim 15, wherein the activation status indicator is a bit indicator of a downlink control information of a downlink shared channel medium access control control element.

25. The UE of claim 15, wherein the one or more TCI states are associated with semi-persistent channel state information reference signal resources or channel state information interference measurement resources.

26. The UE of claim 15, wherein the one or more spatial relationships are associated with semi-persistent sounding reference signal resources.

27. A non-transitory computer-readable medium storing one or more instructions for wireless communication, the one or more instructions comprising:
one or more instructions that, when executed by one or more processors of a user equipment (UE), cause the one or more processors to:
receive an activation status message identifying one or more transmission configuration indicator (TCI) states or one or more spatial relationships, the activation status message being configured to alter one or more activation statuses for the one or more TCI states or the one or more spatial relationships in a single bandwidth part associated with a single component carrier; and
alter the one or more activation statuses of the one or more TCI states or the one or more spatial relationships in a plurality of bandwidth parts associated with a plurality of component carriers based at least in part on an activation status indicator indicating whether the activation status message is to apply to more than one bandwidth part of the plurality of bandwidth parts.

28. An apparatus for wireless communication, comprising:
means for receiving an activation status message identifying one or more transmission configuration indicator (TCI) states or one or more spatial relationships, the activation status message being configured to alter one or more activation statuses for the one or more TCI states or the one or more spatial relationships in a single bandwidth part associated with a single component carrier; and
means for altering the one or more activation statuses of the one or more TCI states or the one or more spatial relationships in a plurality of bandwidth parts associated with a plurality of component carriers based at least in part on an activation status indicator indicating whether the activation status message is to apply to more than one bandwidth part of the plurality of bandwidth parts.

29. The non-transitory computer-readable medium of claim 27, wherein the one or more instructions further cause the UE to:
receive the activation status indicator indicating that the activation status message is to apply to more than one bandwidth part of the plurality of bandwidth parts.

30. The apparatus of claim 28, further comprising:
means for receiving the activation status indicator indicating that the activation status message is to apply to more than one bandwidth part of the plurality of bandwidth parts.

* * * * *